US011231578B2

(12) United States Patent
Egloff et al.

(10) Patent No.: US 11,231,578 B2
(45) Date of Patent: Jan. 25, 2022

(54) SCANNER ARRANGEMENT FOR OPTICAL RADIATION

(71) Applicant: Carl Zeiss Microscopy GmbH, Jena (DE)

(72) Inventors: Thomas Egloff, Jena (DE); Tobias Schroeter, Rudolstadt (DE)

(73) Assignee: Carl Zeiss Microscopy GmbH, Jena (DE)

( * ) Notice: Subject to any disclaimer, the term of this patent is extended or adjusted under 35 U.S.C. 154(b) by 144 days.

(21) Appl. No.: 16/519,833

(22) Filed: Jul. 23, 2019

(65) Prior Publication Data

US 2020/0041782 A1  Feb. 6, 2020

(30) Foreign Application Priority Data

Aug. 1, 2018  (DE) ..................... 10 2018 118 699.1

(51) Int. Cl.
*G02B 26/08* (2006.01)
*G02B 26/10* (2006.01)

(52) U.S. Cl.
CPC ....... *G02B 26/101* (2013.01); *G02B 26/0833* (2013.01)

(58) Field of Classification Search
CPC .......................... G02B 26/101; G02B 26/0833
USPC ...................................................... 359/199.1
See application file for complete search history.

(56) References Cited

U.S. PATENT DOCUMENTS

| 5,691,839 | A | * | 11/1997 | Kobayashi | ......... G02B 21/0048 |
|---|---|---|---|---|---|
| | | | | | 359/201.1 |
| 6,580,554 | B2 | | 6/2003 | Engelhardt et al. | |
| 7,459,698 | B2 | | 12/2008 | Engelmann et al. | |
| 2002/0041439 | A1 | | 4/2002 | Engelhardt et al. | |
| 2006/0011858 | A1 | | 1/2006 | Engelmann et al. | |
| 2014/0133152 | A1 | | 5/2014 | Buehler et al. | |
| 2019/0064494 | A1 | | 2/2019 | Dyba | |

FOREIGN PATENT DOCUMENTS

| DE | 100 50 529 A1 | 4/2002 |
|---|---|---|
| EP | 1 617 267 A2 | 1/2006 |
| WO | 2017/109155 A1 | 6/2017 |

OTHER PUBLICATIONS

German Search Report dated May 15, 2019.

* cited by examiner

*Primary Examiner* — Euncha P Cherry
(74) *Attorney, Agent, or Firm* — Duane Morris LLP

(57) ABSTRACT

A scanner arrangement, suitable for use in laser scanning microscopes, for scanning a scanning field (42) by means of optical radiation (5). It is equipped with at least one scanner (1), which comprises a scanning mirror (2) that is tiltable about one or two scanning axes (3, 4) and means for rotating the scanning field, for scanning a size-variable scanning field and for centring the scanning field centre (43) when panning. The arrangement includes a mechanical pivot device (7) for rotating the scanning field (42). The pivot device is arranged to pivot the scanner (1) about a pivot axis (8). Pivoting is implemented through angular dimensions that correspond to an intended rotation of the scanning field.

14 Claims, 6 Drawing Sheets

SCANNER ARRANGEMENT FOR OPTICAL RADIATION

RELATED APPLICATIONS

The present application claims priority benefit of German Application No. DE 10 2018 118 699.1 filed on Aug. 1, 2018, the contents of which are incorporated by reference in its entirety.

FIELD OF THE INVENTION

The invention relates to a scanner arrangement for scanning a scanning field by means of optical radiation. The scanner arrangement is equipped with at least one beam deflection element, which comprises a scanning mirror that is tiltable about one or two scanning axes, comprising means for rotating the scanning field, for scanning a size-variable scanning field and for centring the scanning field centre when panning. The scanner arrangement is preferably suitable for use in the laser scanning microscopes.

BACKGROUND OF THE INVENTION

In general, scanner arrangements are used for line-like or raster-like scanning of target regions by means of a laser beam, for measurement, processing or image-generation purposes. By way of example, in laser scanning microscopes, scanner arrangements deflect collimated laser radiation from the incoming beam direction through defined angles. The deflected radiation is focused to form a spot using an imaging optical unit and this spot is directed to a multiplicity of locations on the sample successively in time, depending on changes in the deflection angles. Accordingly, the deflection angles are a measure for the locations of the spot on the sample. The light coming from the sample, for example on account of reflection, scattering or fluorescence, is detected in a spatially and temporally resolved manner and evaluated in respect of brightness, wherein the totality of detection signals yield an image of the scanned sample region.

Depending on the embodiment and application, scanner arrangements have one or more beam deflection elements, also referred to as scanners below, which are distinguishable as follows in accordance with their function and their options for actuation:

scanners operating on quasi-static principles, for a one-dimensional deflection; by way of an actuation, these are either permanently adjustable to a predetermined deflection angle or else variably deflectable with virtually freely definable, in particular periodic, functions, albeit only at low scan frequencies, and scanners operating on resonant principles, for a one-dimensional deflection; these are usable with an approximately sinusoidal deflection in time at a certain frequency by means of an energy storage system formed by a spring and a mass, wherein the scan frequency is not adjustable or only adjustable in a minimal range.

Advantageously, quasi-static scanners can be used at higher scan frequencies, with the amplitude however greatly decreasing with increasing frequency. Usable deflections can no longer be realized by quasi-static scanners in the case of maximum scan frequencies available to resonant scanners.

Consequently, scanner arrangements for a one-dimensional beam deflection or for scanning a scanning field consisting of only one line need only be equipped with one scanner.

By contrast, scanner arrangements for the two-dimensional beam deflection or for scanning a two-dimensional, usually rectangular region either comprise only one scanner that deflects in two orthogonal directions, e.g., in the form of a micro-electromechanical system, known as a MEMS, with a scanning mirror that is tiltable about two axes, or comprise two scanners, each of which has a scanning mirror that is tiltable about one axis. By way of example, a first scanner in this case deflects with resonant functionality while the second scanner deflects with quasi-static functionality.

The intention often is to merely scan a section of the maximum possible scanning region by means of an imaging system. The use of scanner arrangements suitable for optionally deflecting the laser beam to a lesser extent than required for scanning the entire scanning region, either in both or else only one scanning direction, is expedient to this end. Only scanning a section from the centre of the maximum possible scanning region is referred to as zoom in the art. This is possible both in the case of scanners operating on quasi-static principles and in the case of scanners operating on resonant principles since deflection angle or scanning amplitude can be varied and thus allows the size of the scanned field to be influenced.

Moreover, there often is the need for scanning a section that is laterally offset from the centre of the maximum possible scanning region; this is referred to as panning in the art. It is well known that, to this end, the deflection of the laser beam additionally has an offset in one or both radiation directions applied thereto. However, a restricted scanning speed and a comparatively complicated actuation of the scanner are disadvantageous in the case of such a deflection offset.

Furthermore, scanner arrangements allowing an adaptation of the scanning region by rotating a rotated sample, known as scanning field rotation or scanning field turning, are often required. By way of example, this is realized by way of a modified actuation of the scanner in the prior art; however, this is only possible if two quasi-static scanners are used because the deflection in the line scan direction must be implemented by way of both scanners in the case of a rotated scanning region, as described in EP 1 617 267 A2, for example. A disadvantage here is that the restriction to quasi-static scanners restricts the possible scanning speed.

A scanning field rotation by means of a rotatable optical component, e.g., an Abbe-Koenig prism, is also known. However, this not only makes the appliance design more complicated and this not only is connected with higher costs, but this also increases the adjustment outlay; additionally, there is a change in the laser power. Moreover, scanner arrangements embodied in this way have a relatively low transmission and are subject to a significant change in the polarization if linearly polarized light is used. The polarization can only be maintained if a further loss of transmission and additional outlay is accepted. Additionally, a differential interference contrast (DIC) is not obtainable or only obtainable with increased outlay. Further disadvantages are that, firstly, the scanning field is not rotated about the centre of the section and, secondly, distortions along at least one axis arise on account of the oblique illumination of the scanning mirrors.

SUMMARY OF THE INVENTION

Proceeding from this prior art, it is the object of the invention to develop a scanner arrangement of the type set forth at the outset, which no longer has the above-described disadvantages.

According to the invention, this object is achieved by virtue of mechanical devices being provided for the purposes of rotating the scanning field, for pivoting beam deflection elements about a pivot axis, with the angle through which pivoting is carried out corresponding to the intended rotation of the scanning field. Furthermore, means for producing offsets for the beam deflection are provided, said means serving for variably influencing the amplitudes during the beam deflection in one or more deflection directions.

Preferably, the scanner arrangement is embodied for the two-dimensional deflection of the optical radiation over the scanning field and said scanner arrangement, in various embodiment variants, comprises either a scanning mirror tiltable about two scanning axes, e.g., a MEMS scanner, wherein the beam deflection along a line is assigned to one scanning axis while the beam deflection to the neighbouring lines in each case is assigned to the other scanning axis, two beam deflection elements, each with a scanning mirror tiltable about one scanning axis, wherein the deflection along a line is assigned to one beam deflection element while the deflection to neighbouring lines in each case is assigned to the other beam deflection element.

Here, the beam deflection along a line with the resonant scanning axis is preferably implemented by primarily sinusoidal scanning function. The beam deflection to neighbouring lines in each case with the quasi-statically actuatable scanning axis/deflection element is implemented by a step-shaped scanning function. An imaging optical unit that images the deflected radiation into the object plane should be disposed downstream of the scanner arrangement, particularly when this is used in laser scanning microscopes.

For the purposes of producing offsets, an offset actuator, in particular in the form of a tilt device with a tilt axis aligned parallel to the scanning axis, is provided in the case of the beam deflection along a line and/or a modification of the scanner actuation is provided in the case of the beam deflection from line to line.

According to the invention, the scanner arrangement is equipped with devices for compensating an offset of the scanning field centre during the rotation of the scanning field. Preferably, the compensation is implemented continuously by a continuous change in the line feed and line scan direction during the pivoting of the beam deflection element or the scanner arrangement such that, as a result of the pivoting, the scanning field centre is situated at its original position and line feed and line scan point in the desired directions, which correspond to the rotation of the scanning field. Consequently, the scanning field is situated—rotated about its centre—at the original location on the object plane.

By way of example, galvano scanners, galvano resonance scanners or piezo scanners should be provided for the line scan and galvano scanners should be provided for the line feed. The embodiment of the scanner arrangement in the form of a complex assembly, for instance as a laser scanning module, is particularly advantageous.

BRIEF DESCRIPTION OF THE DRAWINGS

The present invention is explained below on the basis of scanner arrangements with two-dimensional deflections; however, it expressly also relates to scanner arrangements with one-dimensional deflections in an appropriately modified embodiment or with an appropriately modified actuation. Assigned to the exemplary embodiments:

FIG. 2b illustrates a modification of the scanner shown in FIG. 1a;

FIG. 3b illustrates one alternative embodiment of the scanner shown in FIG. 3a;

FIG. 3c illustrates another alternative embodiment of the scanner shown in FIG. 3a; and FIG. 3d illustrates yet a further alternative embodiment of the scanner shown in FIG. 3a;

FIG. 4b illustrates a modification of the scanner of FIG. 4a.

DETAILED DESCRIPTION OF THE INVENTION

The explanations relating to the scanner arrangements illustrated in FIG. 1a and FIG. 2a to FIG. 4b in exemplary fashion are implemented on the basis of a basic mode without image field rotation in each case for reasons of clarity. The functionalities and principles of operation according to the invention in relation to the image field rotation are explained on the basis of FIG. 1b; these apply, in principle and analogously, to all scanner arrangements illustrated in FIG. 1a and FIG. 2a to FIG. 4b. The scanners described in the scanner arrangements expressly also comprise elements not illustrated in detail, such as, for instance, drives and mounts for the respective scanning mirrors. These elements can both have a discrete structure or else be completely integrated in an assembly, such as MEMS scanners (micro-electromechanical systems=MEMS) produced using micro-technologies, for example. Likewise, resonant scanners and the offset actuators assigned thereto can be embodied as complex assemblies.

The terms "scanning region" and "scanning field" are used synonymously in the text of the description, just like the terms "scanner" and "beam deflection element" and the terms "optical radiation" and "laser beam".

Figure 1A:
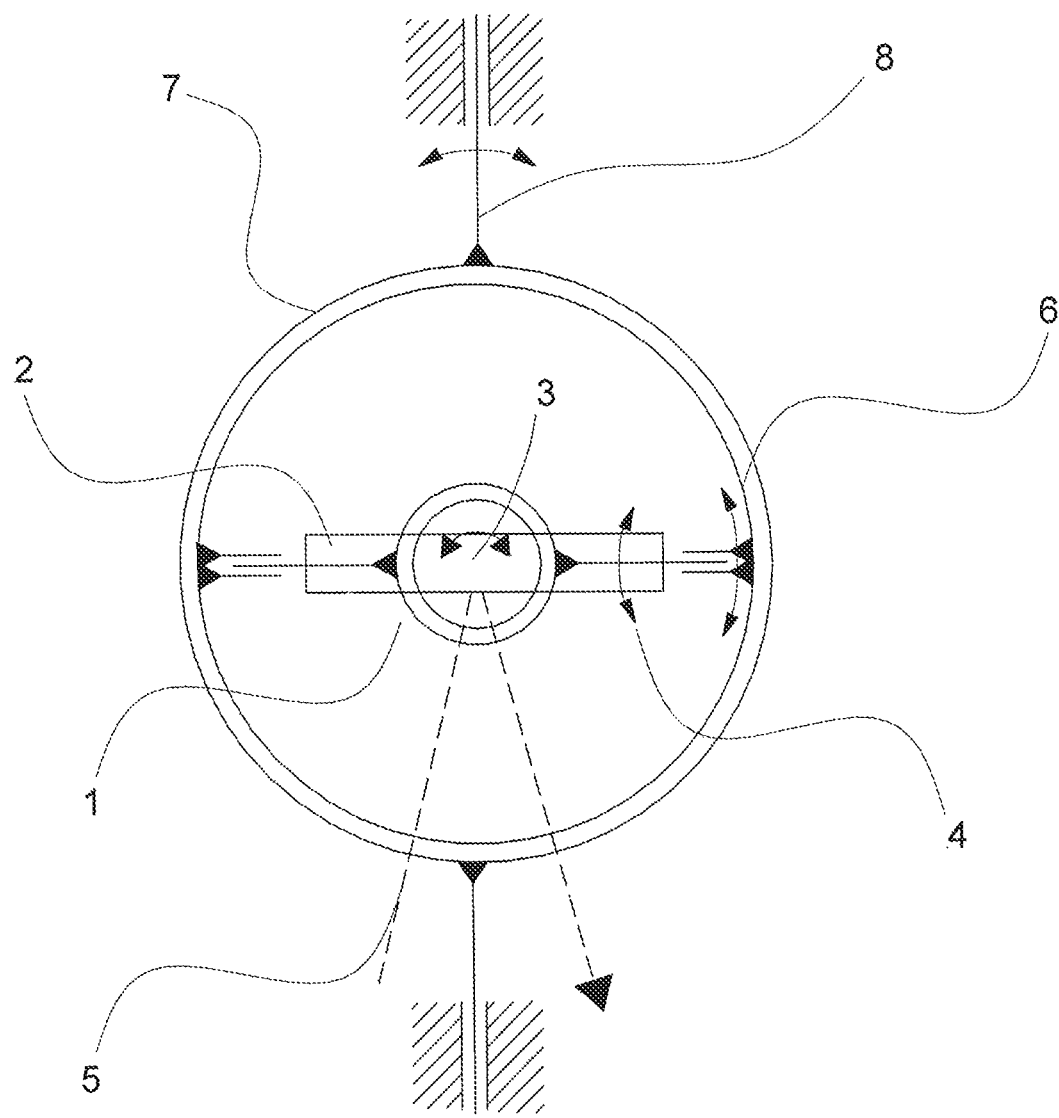
FIG. 1a illustrates a scanner arrangement, with a scanner and a scanning mirror for the two-dimensional deflection of a laser beam, wherein the deflection is implemented by the resonant scanning function in one direction and by a quasi-static scanning function in the other direction, with a mechanical pivot apparatus for rotating the scanning field according to the invention and with offset functions for influencing the amplitudes during the beam deflection.

FIG. 1a shows a scanner arrangement with a scanner 1 embodied as a MEMS, the scanning mirror 2 of which is tiltable about two orthogonal axes, specifically the scanning axes 3 and 4, such that an incident laser beam 5 is deflected from its incoming direction in two directions and it is thus possible to scan a two-dimensional scanning field. The scanning axes 3, 4 are aligned in such a way that they intersect at least approximately with one another and with the mirror surface of the scanning mirror 2. The scanner 1 is coupled to a separately actuatable offset actuator 6 for the purposes of producing deflection offsets, the tilt axis of said offset actuator being aligned in collinear or at least parallel fashion with respect to the scanning axis 4. Furthermore, provision is made of a pivot device 7, comprising a pivot bearing and an actuatable drive element (not illustrated). The associated pivot axis 8 is aligned in orthogonal fashion with respect to the scanning axes 3, 4 and intersects the latter and the mirror surface of the scanning mirror 2 at least approximately.

During the operation of the scanner arrangement, the tilt of the scanning mirror 2 about the scanning axis 3 is preferably implemented for the purposes of scanning lines of the scanning field. Here, the line scan is carried out using a resonant scanner with an approximately sinusoidal scanning function by virtue of the angle of the beam deflection oscillating about a central value. In FIG. 1a, the scanning axis 3 is aligned perpendicular to the plane of the drawing; accordingly, the laser beam 5 correspondingly remains in the plane of the drawing.

After scanning a line, the scanning mirror 2 is tilted through a predetermined angle about the scanning axis 4 in each case such that the laser beam 5 deflected thereby (correspondingly out of the plane of the drawing) is directed to an adjacent line, which is subsequently scanned by way of a line scan. The deflection by means of scanning mirror 2 is referred to as line feed; preferably, the latter is operated in quasi-static fashion and actuated by a step-shaped scanning function.

Figure 1B:
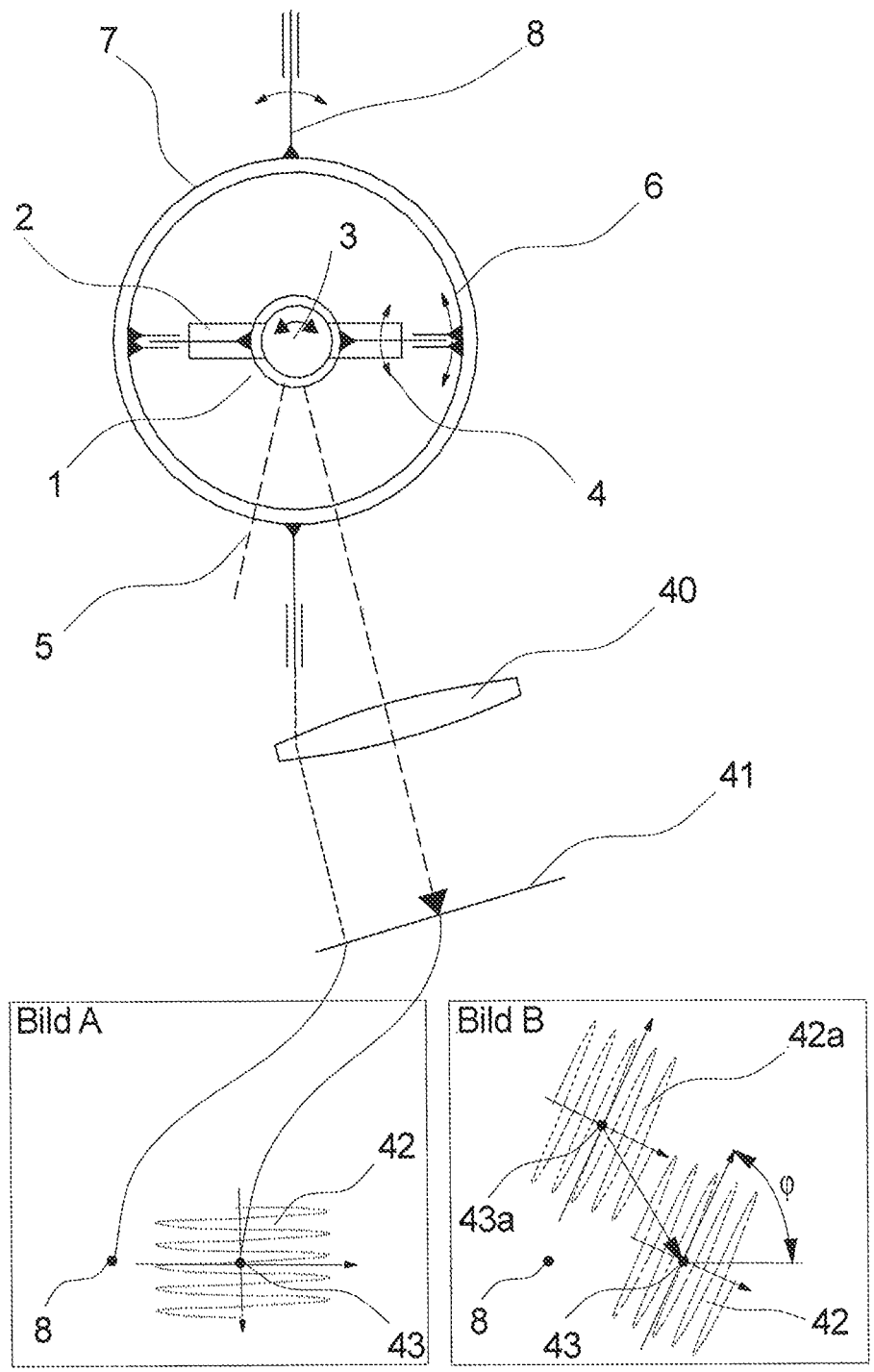
FIG. 1b illustrates an elucidation of the compensation of an unwanted decentration of the scanning field with respect to its centre position, caused by the rotation of the scanning field.

As is evident from FIG. 1b, the deflected laser beam 5 is directed on an imaging optical unit 40, which images the laser beam 5 into an object plane 41. Thus, a defined two-dimensional scanning field 42 arises in the object plane 41 by way of a multiplicity of lines lying in parallel next to one another.

In the basic mode, this arrangement facilitates scanning of the scanning field 42 with a size and alignment, defined by preset parameters, within the object plane 41. Here, the size is determined by the scanning amplitudes and the alignment is defined by the scanning directions. According to the invention, the following further applications are possible in addition to the basic mode:

Scanning field rotation: In order to rotate the scanning field 42 through a predetermined angle about its centre, within the object plane 41, pivoting according to the invention of the scanning axes 3, 4 about the pivot axis 8 and means for compensating an offset of the scanning field centre 43 in relation to its original position as a consequence of the pivot movement are present, the means of compensation specifically functioning as follows:

The scanning field centre 43 and the pivot axis 8 are offset laterally next to one another in the object plane 41 for structural reasons, as illustrated in Image A in FIG. 1b with a view on the object plane 41. If the scanner 1 or, in this case, the scanner arrangement is rotated through a predetermined angle φ about the pivot axis 8, the scanning field 42 is changed (see Image B) to form the scanning field 42a with a rotated spatial orientation and an offset scanning field centre 43a.

Although the intended image field rotation would have been carried out in this position, the scanning field centre 43a would undesirably be offset in relation to the original position in Image A since it followed an arc, corresponding to the angle φ, about the pivot axis 8.

In order to avoid this offset, or not even allow it to arise, the invention ensures that, if possible already in real time, the scanning field 42 is rotated during the pivoting but the scanning field centre 43 remains centred on the original position. This is achieved by virtue of the beam deflection being continuously adapted in the line feed and line scan directions depending on the change in rotational angle occurring at the same time such that the scanning field 42 is rotated virtually continuously and, in so doing, positional deviations of the scanning field centre 43 are continuously compensated at the same time such that, at the end of the rotation or as a result with the pivoting, the scanning field 42 is rotated through the desired angle, and hence the image rotation is carried out, and the scanning field centre 43 is situated at the original position like in Image A, as required.

The settings for the beam deflection in both scanning directions required for this compensation either are ascertained and calculated directly using measurement technology, as a function of the current change in rotational angle, or are predetermined on the basis of system-dependent look-up tables, ascertained in advance, by way of a change in the actuation. Optionally, it is advantageous to once again iteratively optimize, toward the desired scanning field position, the positional error that remains after a first completed position and alignment correction.

Preferably, an offset is applied to the quasi-static scanning function of the line feed in this case. By contrast, this is not possible in the resonant scanning function that is provided for the line scan. Therefore, the separately actuatable offset actuator 6 with a tilt axis that is aligned in collinear or at least parallel fashion with respect to the scanning axis 4 for the line scan is present for the purposes of producing an offset in the line scan direction.

Panning: In order to only scan a portion of the scanning field 42 during panning, it is necessary to centre the centre of this portion on the centre of the scanning field 42. According to the invention, this is once again implemented—as described above on the basis of the scanning field rotation—by changing the scanning aptitudes, optionally with or without the inclusion of the offset functions available for both deflection directions. Compared to the prior art, the offsets facilitate a greater breadth of application of the scanner arrangement according to the invention.

Zoom: By changing the scanning amplitude in both scanning directions, optionally with or without the inclusion of the offset functions available according to the invention for both deflection directions, it is possible to vary the size of the scanning field 42 and thus realize a zoom function, with the scanning field 42 modified in terms of its size remaining at the same position in the object plane 41 with its scanning field centre 43. Compared to the prior art, the offsets facilitate a substantially greater zoom range.

Figure 2A:
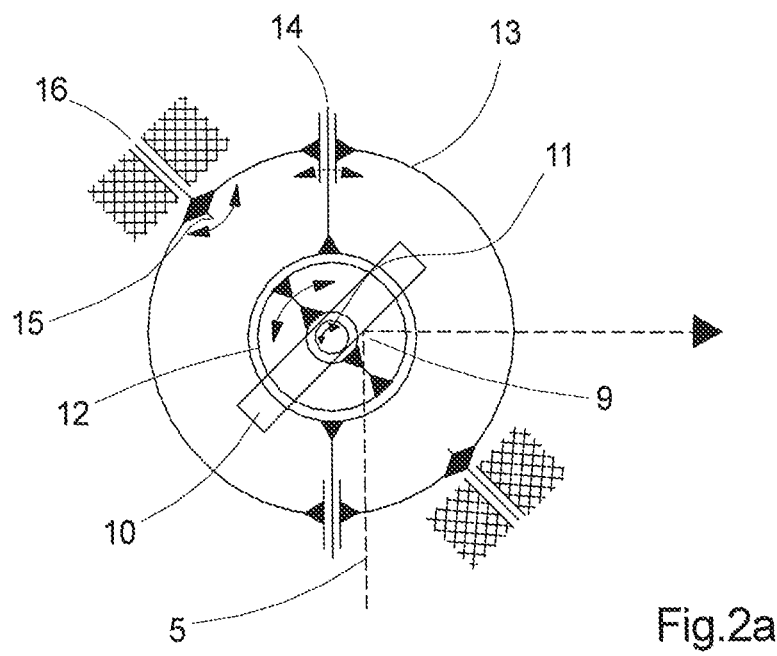
FIG. 2a illustrates a scanner arrangement with two scanners and one scanning mirror, embodied for the two-dimensional deflection of a laser beam, wherein a first scanner is operated with a resonant scanning function and the second scanner is operated with a quasi-static scanning function, having an offset actuator assigned to the first scanner and comprising a mechanical pivot apparatus for rotating the scanning field.

The exemplary embodiment according to FIG. 2a comprises a scanner arrangement with a resonant scanner 9, the scanning mirror 10 of which is tiltable about a scanning axis 11 for the purposes of deflecting the laser beam 5 in a first scanning direction, preferably the line scan direction. In order to apply an offset to the deflection in this scanning direction where necessary, a separately actuatable offset actuator 12 is present, the tilt axis of which is aligned in collinear or at least parallel fashion with respect to the scanning axis 11. The assembly made of scanner 9 and offset actuator 12 is tiltable about a scanning axis 14 by means of a second scanner 13, in this case a quasi-static scanner, as a result of which the laser beam 5 is deflectable in a second scanning direction, preferably the line feed direction. In a special case, both scanning directions can be aligned perpendicular to one another.

Scanning of a two-dimensional scanning field is possible by way of the deflection in the two scanning directions. Moreover, the quasi-static scanner 13 facilitates the optional production of an offset for the deflection in the second scanning direction. Here, too, the size of the scanning field can be changed, and hence a zoom function can be realized, by varying the scanning amplitude in both scanning directions.

In order only to scan a portion of the maximum available scanning field as panning, the centre of the scanning field must be centred on this portion or the scanning field must be decentred from its original centre. In this respect, the quasi-static scanning function offers the option of applying an offset to the line feed by way of an appropriate scanner actuation. By contrast, this is not possible in the resonant scanning function that is provided for the line scan. Here, the offset actuator 12 with its tilt axis aligned in collinear fashion with respect to the scanning axis 11 serves to produce an offset in the line scan direction.

The described assignment of the line scan to the resonant scanner 9 and the assignment of the line feed to the quasi-static scanner 13, e.g., a galvano scanner, is purely exemplary. Deviating configurations expressly also lie within the scope of the invention.

A pivot device 15 is present in order to be able to rotate the scanning field where necessary, said pivot device comprising a pivot bearing and actuatable drive element (not explicitly illustrated). The pivot axis 16 is aligned at least approximately parallel to the normal of the mirror surface of the scanning mirror 10.

Figure 2B:
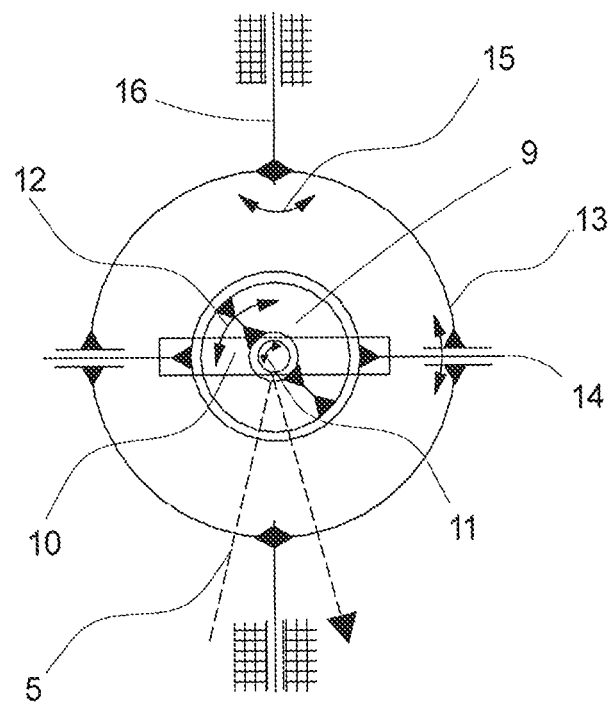

The scanner arrangement according to FIG. 2b and the functionality thereof is largely comparable to the scanner arrangement according to FIG. 2a, with merely the alignment of the scanning mirror 10 and the spatial orientations of scanning axis 11 and pivot axis 16 being modified in this case. For assistance purposes, tilted and pivot directions are specified by arrow directions in both FIG. 2a and FIG. 2b.

Figure 3A:
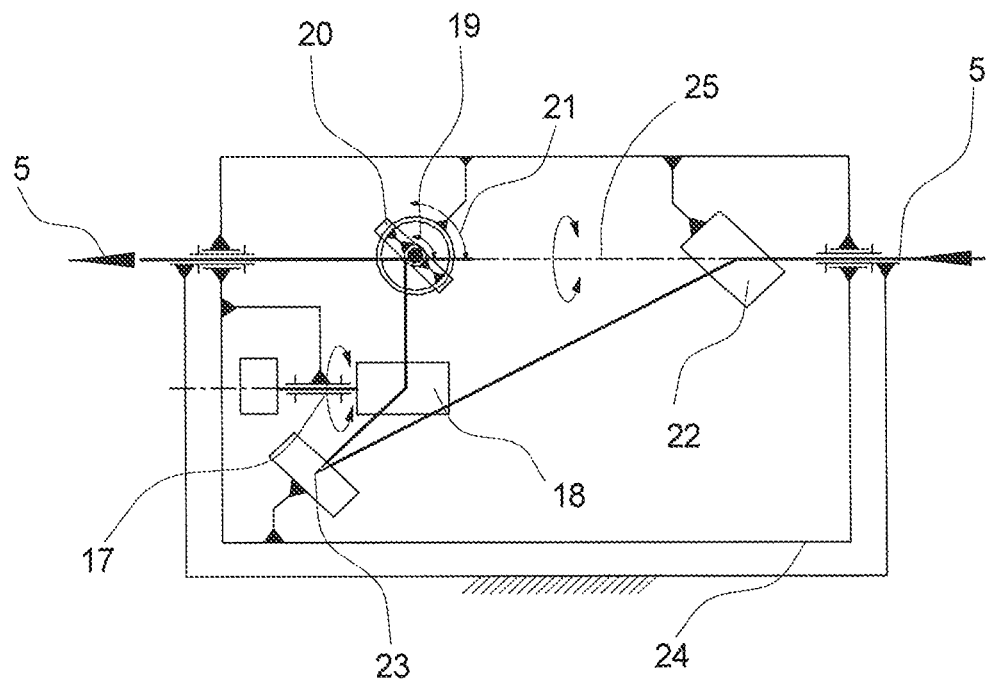
FIG. 3a illustrates a scanner arrangement with two scanners and two scanning mirrors, embodied for the two-dimensional deflection of a laser beam, wherein a first scanner is operated with a resonant scanning function and the second scanner is operated with a quasi-static scanning function.

The scanner arrangement according to FIG. 3a comprises a quasi-static scanner 17 with a scanning mirror 18 that deflects the laser beam 5 in a first scanning direction, preferably the line feed direction, and a resonant scanner 19 with a scanning mirror 20 that deflects the laser beam 5 in approximately orthogonal fashion in a second scanning direction, preferably the line scan direction. Furthermore, a beam deflection is present, which consists of two deflection mirrors 22 and 23 and which steers the laser beam 5 onto the scanning mirrors 18 and 20 at a defined angle. The described components are held by means of a frame 24, which is mounted so as to be pivotable about a pivot axis 25. The pivot axis 25 extends at least approximately in collinear fashion with respect to the laser beam 5 that is incident into the scanner arrangement and that emerges from the scanner arrangement. The pivoting about a pivot axis 25 is realized by means of an actuatable actuator (not explicitly illustrated).

When operating the scanner arrangement in the basic mode, the incident laser beam 5 is steered onto the scanning mirror 18 perpendicular to the scanning axis by means of the deflection mirrors 22 and 23. From there, the laser beam 5 is reflected onto the scanning mirror 20 of the scanner 19 in such a way that it is incident approximately in perpendicular fashion in relation to the scanning axis thereof and the scanning mirror 20 deflects the laser beam 5 in a direction that preferably extends in orthogonal fashion to the direction of the radiation coming from the scanning mirror 18. Thereupon, the laser beam 5 deflected in two scanning directions leaves the scanner arrangement approximately in collinear or parallel fashion with respect to the pivot axis 25, at least in the basic position of the scanners. In the case where the scanners are deflected from the basic position (the latter illustrated in FIG. 3a), the beam no longer leaves the arrangement in parallel fashion with respect to the pivot axis 25 in any case.

The size of the scanning field can be changed in both directions by changing the scanning amplitude (zoom). Moreover, the scanner 18 facilitates a direct adjustment of the deflection angle in the line feed direction by an offset for the purposes of realizing panning on account of its quasi-static functionality. The resonant scanner 20 is connected to an offset actuator 21 which, likewise for the purposes of panning, facilitates the application of an offset to the line scan direction.

Figure 3B:
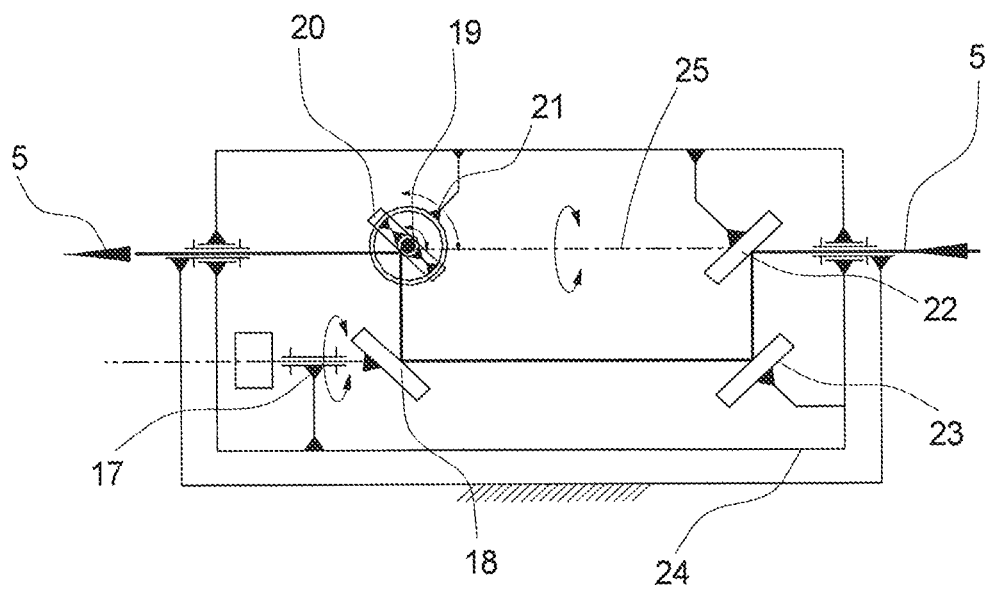

While the laser beam 5 is incident on the scanning mirror 18 of the scanner 17 in a manner perpendicular to the scanning axis of the latter in the variant according to FIG. 3a, the variant according to FIG. 3b is embodied in such a way that the laser beam 5 is incident on the scanning mirror 18 in the direction of the scanning axis of the scanner 17. Here, too, the laser beam 5 deflected in two scanning directions leaves the scanner arrangement at least approximately in collinear fashion with respect to the pivot axis 25, about which the frame 24 is pivotable.

As an alternative to the embodiments described on the basis of FIG. 3a and FIG. 3b, interchanging the positions of the scanner 17 and of the scanner 19, including the offset actuator 21, lies within the scope of the invention. Here, the scanning axes of the scanners 17 and 19 and the axis of rotation of the offset actuator 21 relative to the laser beam 5 are equivalent in terms of the basic positions to the illustration shown in FIG. 3a and FIG. 3b; consequently, the deflection directions of the laser beam 5 emerging from the scanner arrangement remain constant.

A scanning field rotation is brought about by means of a rotation of the frame 24. Here, the line scan direction and the line feed direction are rotated with respect to one another, with the angle between these two directions being maintained in each case. Thus, the angle of 90° between the two scanning directions is also maintained in the case of an arrangement with orthogonal scanning directions. The scanning directions are merely rotated through an offset angle.

In the case of the scanning field rotation, the centre of rotation corresponds to the angle or the location of the imaging with an imaging optical unit, which is illuminated in the basic position. If the scanning field centre is displaced by an offset, the scanning field can simply be rotated thereabout by virtue of the offset as a result of the offset actuator 21 and the offset as a result of the quasi-static scanner 18 being adapted in accordance with the scanning field rotation angle.

Figure 3C:
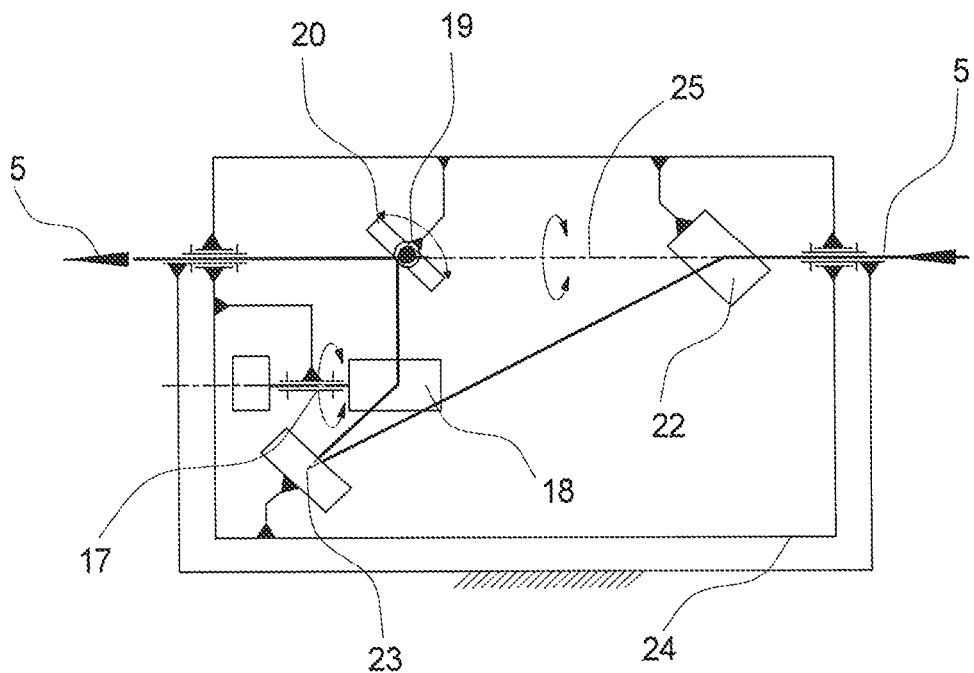
Figure 3D:
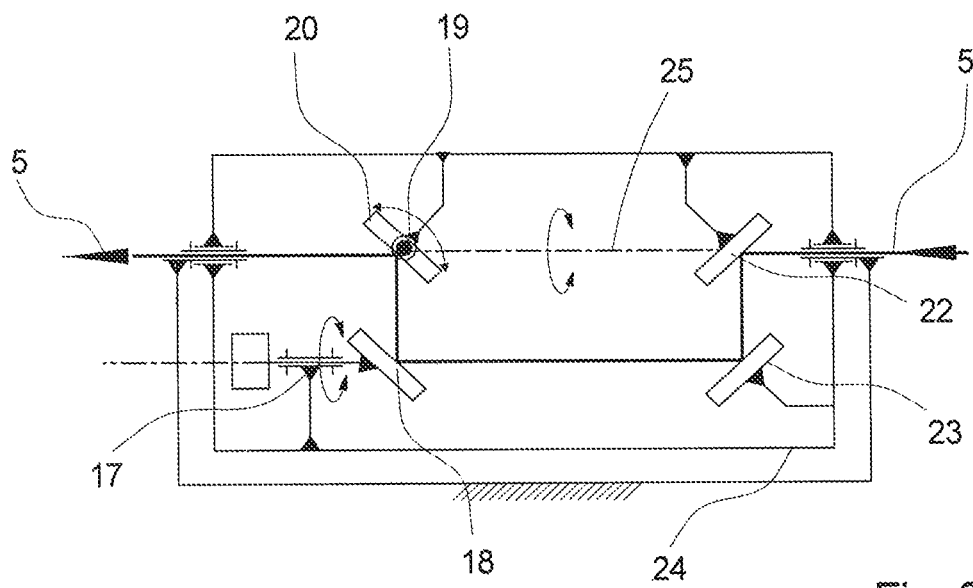

In the embodiments illustrated in FIG. 3c and FIG. 3d, the offset actuator 21 has been dispensed with in each case and only the resonant scanner 20 is present; as a result of this, panning is only possible in the scanning direction produced by the quasi-static scanner 17. Otherwise, all options as in the embodiments according to FIG. 3a and FIG. 3b have been maintained.

Figure 4A:
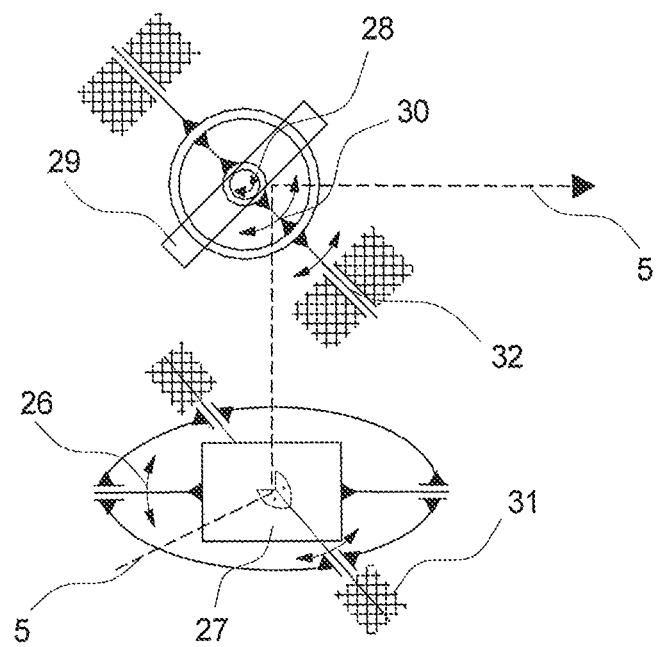
FIG. 4a illustrates a scanner arrangement with two scanners and two scanning mirrors, embodied for the two-dimensional deflection of the laser beam, wherein a first scanner is operated with a resonant scanning function and the second scanner is operated with a quasi-static scanning function, comprising an offset actuator assigned to the second scanner and comprising two mechanical pivot apparatuses for rotating the scanning field.

The two-dimensional scanner arrangement according to FIG. 4a comprises a quasi-static scanner 26 with a scanning mirror 27, which deflects the laser beam 5 in a first direction, preferably the line feed direction. A resonant scanner 28 disposed downstream in the beam direction and comprising a scanner mirror 29 brings about an approximately orthogonal deflection in a second direction, preferably the line scan direction.

In the basic mode, the laser beam 5 is incident in the scanner arrangement at right angles to the scanning axis of the quasi-static scanner 26. The scanning axis of the scanner 26 is aligned perpendicular to the normal of the scanning mirror 27. Subsequently, the beam reflected by the scanning mirror 27 is incident on the scanning mirror 29 of the resonant scanner 28, which realizes the line scan. The scanning axis of the resonant scanner 28 is aligned orthogonal to the normal of the scanning mirror 29. In the basic mode, the deflection angle at both scanners 26, 28 is preferably 90°.

The size of the scanning field to be scanned can be changed in both directions by changing the scanning amplitude of the scanner (zoom function). Moreover, the scanner 26 facilitates a direct adjustment of the deflection angle in the line feed direction by an offset for the purposes of realizing panning on account of its quasi-static functionality. The resonant scanner 28 is coupled to an offset actuator 30, the tilt axis of which extends in collinear or at least parallel fashion with respect to the scanning axis. The offset actuator 30 facilitates panning by applying an offset to the line scan direction.

The quasi-static scanner 26 is pivotable about a pivot axis 31 for the purposes of a scanning field rotation; the resonant scanner 28 and the offset actuator 30 are pivotable together about a pivot axis 32. The axes 31, 32 extend at least approximately parallel with respect to one another and are aligned in parallel with respect to the normals of the scanning mirrors 27 and 29. Additionally, a pivot device with at least one actuatable drive element is present (not explicitly illustrated), causing the pivoting about both axes 31 and 32 or about the normals of the scanning mirrors 27 and 29 in synchronous fashion through angles of rotation with at least approximately the same size.

In the case of the scanning field rotation, the centre of rotation also corresponds in this case to the pivot angle or the location of the imaging with an optical unit, which is illuminated in the basic position. If the scanning field centre is displaced by an offset, the scanning field can simply be rotated thereabout by virtue of the offset as a result of the offset actuator 30 and the offset as a result of the quasi-static scanner 26 being adapted in accordance with the scanning field rotation angle.

Figure 4B:
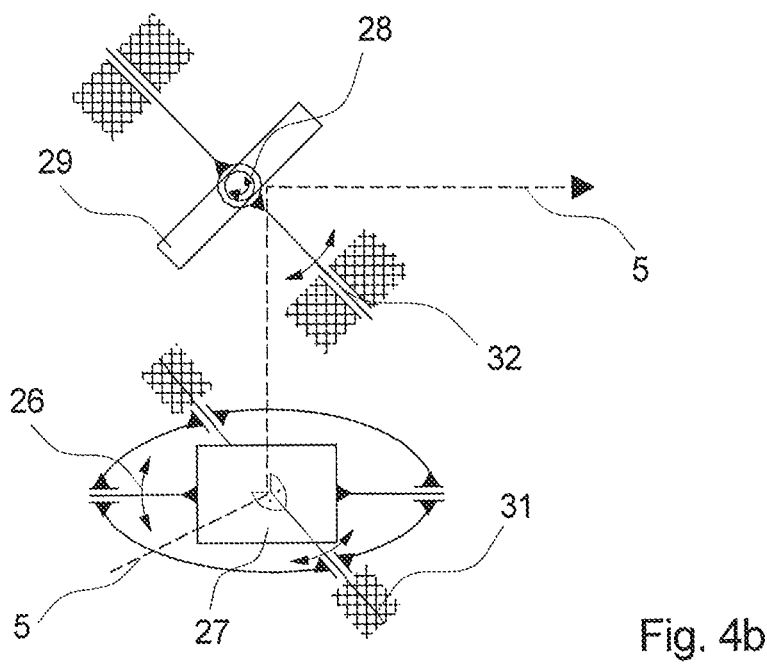

Deviating from the illustration in FIG. 4a, the resonant scanner 28 in the arrangement according to FIG. 4b is not coupled to an offset actuator, as a result of which panning in this case is only possible in the scanning direction produced by the quasi-static scanner 26.

As an alternative to the embodiments described on the basis of FIG. 4a and FIG. 4b, interchanging the positions of scanner 26 on the one hand and of scanner 28, including the offset actuator 30, on the other hand also lies within the scope of the invention. Here, the scanning axes of the scanners 26, 28 and the axis of rotation of the offset actuator 30 relative to the respective incident and deflected beam 5 are equivalent in terms of their basic positions to the illustration shown in FIG. 4a and FIG. 4b; consequently, the beam profile is constant and the scan directions of the emerging laser beam 5 are maintained.

An optical unit (not illustrated) for imaging the first scanner 26, as seen in the radiation direction, onto the second scanner 28 is advantageously provided along the extent of the optical radiation between the two scanners 26, 28.

Compared to the prior art, the following advantages are achieved using the scanner arrangements according to FIG. 1 to FIG. 4b:

there is a less complicated scanning field rotation without additional optical elements, a realization as a laser scanning module for largely universal use is possible, panning (apart from FIG. 1a) and zoom are possible, there is no change in the polarization during the scanning field rotation, there is no change in the laser power during the scanning field rotation, there is a minimal lateral offset of the laser beam since there is only a small distance between the scanning axes of the two scanners, there is a higher scanning speed, even in the case of a large scanning field.

The scanner arrangement according to FIG. 1 has the additional advantage of a high transmission on account of the use of only one deflection element for both scanning directions.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Scanner
2 Scanning mirror
3 Scanning axis
4 Scanning axis
5 Laser beam
6 Offset actuator
7 Pivot device
8 Pivot axis
9 Scanner
10 Scanning mirror
11 Scanning axis
12 Offset actuator
13 Scanner
14 Scanning axis
15 Pivot device
16 Pivot axis
17 Scanner
18 Scanning mirror
19 Scanner
20 Scanning mirror
21 Offset actuator
22 Deflection mirror
23 Deflection mirror 24 Frame
25 Pivot axis
26 Scanner
27 Scanning mirror
28 Scanner
29 Scanning mirror
30 Offset actuator
31 Pivot axis
32 Pivot axis
40 Imaging optical unit
41 Object plane
42, 42a, 42b Scanning field
43, 43a, 43b Scanning field centre
φ Angle

What is claimed is:

1. Scanner arrangement for deflecting optical radiation over a scanning field formed in an object plane, comprising:
at least one reflective beam deflection element having a scanning mirror that is tiltable about one or two scanning axes;
means for rotating the scanning field within the object plane;
a mechanical pivot device for rotating the scanning field, said pivot device being arranged to pivot the beam deflection element about a pivot axis, wherein pivoting through certain angular dimensions corresponds to an intended rotation of the scanning field; and
means for compensating offset of the scanning field centre from its original position in the object plane as a consequence of pivoting.

2. Scanner arrangement according to claim 1, embodied for two-dimensional deflection of the optical radiation.

3. Scanner arrangement according to claim 1, further comprising a beam deflection element, which comprises a scanning mirror that is tiltable about two scanning axes, wherein
beam deflection along a line is assigned to a first scanning axis and beam deflection onto neighbouring lines of the scanning field in each case is assigned to the second scanning axis.

4. Scanner arrangement according to claim 3, wherein a MEMS scanner is provided as a beam deflection element.

5. Scanner arrangement according to claim 1, further comprising two beam deflection elements, which each comprise a scanning mirror that is tiltable about one scanning axis in each case, wherein
beam deflection along a line is assigned to one beam deflection element and beam deflection onto neighbouring lines of the scanning field in each case is assigned to the other beam deflection element.

6. Scanner arrangement according to claim 1, further comprising an imaging optical unit disposed downstream of the deflected optical radiation, for imaging the latter into an object plane.

7. Scanner arrangement according to claim 3, further comprising a resonant scanning function for deflecting the beam along a line and the beam deflection onto neighbouring lines in each case is provided by way of a quasi-static scanning function for deflecting the beam.

8. Scanner arrangement according to claim 3, wherein the pivot axis is aligned in orthogonal fashion with respect to the scanning axes and intersects with the latter near the scanning mirror surfaces of the scanning mirrors.

9. Scanner arrangement according to claim 1, wherein said means for compensating the offset of the scanning field centre from its original position is provided by offsets for the beam deflection, wherein an offset actuator, in particular in the form of a tilt device with a tilt axis aligned parallel to the scanning axis is provided for the beam deflection along a line, and a modified scanner actuation is provided for the beam deflection from line to line.

10. Scanner arrangement according to claim 9, wherein the compensation is provided continuously by a continuous change in line feed and line scan direction during the pivoting of the beam deflection element of the scanner arrangement such that, as a result of the pivoting, the scanning field centre is situated at its original position and line feed and line scan point in the desired directions, which correspond to the rotation of the scanning field.

11. Scanner arrangement according to claim 1, wherein, as beam deflection elements,
galvano scanners, galvano resonance scanners or piezo scanners are provided for a line scan and galvano scanners are provided for a line feed.

12. Scanner arrangement according to claim 1, wherein a variation in scan amplitudes is provided for zoom or panning purposes.

13. Scanner arrangement according to claim 1, embodied as a complex assembly, preferably as a laser scanning module.

14. Scanner arrangement according to claim 1, embodied as a laser scanning module.

* * * * *

UNITED STATES PATENT AND TRADEMARK OFFICE
CERTIFICATE OF CORRECTION

PATENT NO. : 11,231,578 B2
APPLICATION NO. : 16/519833
DATED : January 25, 2022
INVENTOR(S) : Thomas Egloff and Tobias Schroeter It is certified that error appears in the above-identified patent and that said Letters Patent is hereby corrected as shown below:

In the Claims

Column 12, Line 42-43 now reads: "as a complex assembly, preferably as a laser scanning module."
should read: --as a complex assembly.--

Signed and Sealed this
Tenth Day of May, 2022

Katherine Kelly Vidal
*Director of the United States Patent and Trademark Office*